US011373195B2

(12) United States Patent
Butler et al.

(10) Patent No.: US 11,373,195 B2
(45) Date of Patent: *Jun. 28, 2022

(54) SYSTEMS AND METHODS FOR TARGETED ADVERTISING

(71) Applicant: NEXTLEVEL ASSOCIATION SOLUTIONS, INC., Fairfield, CA (US)

(72) Inventors: W. Jeffrey Butler, Fairfield, CA (US); Gregory A. Pater, Fairfield, CA (US)

(73) Assignee: NEXTLEVEL ASSOCIATION SOLUTIONS, INC., Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/403,276

(22) Filed: May 3, 2019

(65) Prior Publication Data
US 2019/0311379 A1    Oct. 10, 2019

Related U.S. Application Data

(63) Continuation of application No. 13/604,252, filed on Sep. 5, 2012, now Pat. No. 10,311,449.

(51) Int. Cl.
*G06Q 30/02* (2012.01)
(52) U.S. Cl.
CPC ......... *G06Q 30/02* (2013.01); *G06Q 30/0251* (2013.01); *G06Q 30/0269* (2013.01)
(58) Field of Classification Search
None
See application file for complete search history.

(56) References Cited

U.S. PATENT DOCUMENTS

| 7,016,866 | B1 | 3/2006 | Chin et al. |
| 7,831,471 | B2 | 11/2010 | Adams |
| 7,958,011 | B1 | 6/2011 | Cretney et al. |
| 8,234,174 | B1* | 7/2012 | Eagon ................. G06Q 30/018 709/200 |
| 2002/0062218 | A1* | 5/2002 | Pianin .................. G06Q 50/16 705/37 |
| 2002/0161635 | A1 | 10/2002 | Berg et al. |
| 2003/0004861 | A1* | 1/2003 | Amend ................. G06Q 40/04 705/37 |
| 2003/0078897 | A1* | 4/2003 | Florance ............... G06Q 30/02 705/80 |
| 2004/0249705 | A1 | 12/2004 | Spencer et al. |
| 2005/0288957 | A1 | 12/2005 | Eraker et al. |

(Continued)

*Primary Examiner* — Chrystina E Zelaskiewicz
(74) *Attorney, Agent, or Firm* — Haynes and Boone, LLP

(57) ABSTRACT

Systems and methods for targeted advertising are described. The method may include receiving information regarding a future event. The information may include a time and a user identification. Receiving local additional information regarding the user from the one or more databases; requesting third party additional information regarding the user from one or more third party databases; accessing advertiser information from the one or more databases; selecting one or more advertisements based on the advertiser information, information regarding the future event, the local additional information, and the third party additional information; creating a communication template for the one or more selected advertisers; and sending the communication template.

18 Claims, 10 Drawing Sheets

(56) References Cited

U.S. PATENT DOCUMENTS

| | | |
|---|---|---|
| 2006/0161654 A1* | 7/2006 | Hollingsworth ........ H04L 67/02 709/224 |
| 2008/0126170 A1 | 5/2008 | Leck et al. |
| 2008/0262925 A1 | 10/2008 | Kim et al. |
| 2009/0299839 A1 | 12/2009 | Uhl et al. |
| 2009/0319380 A1 | 12/2009 | Jacoby et al. |
| 2010/0198684 A1 | 8/2010 | Eraker et al. |
| 2012/0030026 A1 | 2/2012 | Antonello et al. |
| 2012/0066061 A1 | 3/2012 | Clement |
| 2012/0277994 A1 | 11/2012 | Broome |

\* cited by examiner

SYSTEMS AND METHODS FOR TARGETED ADVERTISING

CROSS REFERENCE TO RELATED APPLICATION

This is a continuation application of U.S. patent application Ser. No. 13/604,252, filed on Sep. 5, 2012. The disclosure of the prior application is hereby incorporated by reference in its entirety.

FIELD OF THE INVENTION

The present invention relates to systems and methods for targeted advertising and, more specifically, to systems and methods for improving accuracy and tracking of advertising.

BACKGROUND OF THE INVENTION

Existing systems for targeted advertising may be used to provide advertisements based on various pieces of individual information.

In specific applications, there are certain times when advertisers would like to direct advertisements to particular customers. For example, it is known that an individual purchasing property is likely to spend significantly more money on goods and services around the time of the purchase than other individuals of similar demographics in similar locations. As such, it would be advantageous to direct advertisements for services related to moving or new home purchases to real estate purchasers at the time of purchase. Existing systems can provide advertisements around the time of purchase, but are typically provided after a real estate transaction is complete. The purchasing individual, however, often has needs for goods and services prior to events, such as closing of a property. Furthermore, it is not always possible to determine based on publicly available information when an individual is either selling or buying real estate. Systems and methods that do exist do not provide advertisements specific to users based on various characteristics of the user and property. Similar issues arise for applications outside the field of real estate.

Needs exist for improved systems and methods for targeted advertising that provide timely and narrowly tailored advertisements.

SUMMARY OF THE INVENTION

Embodiments of the present invention solve many of the problems and/or overcome many of the drawbacks and disadvantages of the prior art by providing systems and methods for targeted advertising.

Embodiments of the present invention may include systems and methods for targeted advertising. The systems and methods may include receiving information regarding a future event. The information may include a time and a user identification. Receiving local additional information regarding the user from the one or more databases; requesting third party additional information regarding the user from one or more third party databases; accessing advertiser information from the one or more databases; selecting one or more advertisements based on the advertiser information, information regarding the future event, the local additional information, and the third party additional information; creating a communication template for the one or more selected advertisers; and sending the communication template.

Additional features, advantages, and embodiments of the invention are set forth or apparent from consideration of the following detailed description, drawings and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION OF THE PREFERRED EMBODIMENTS

Systems and methods are described for targeted advertising. The examples described herein relate to real estate transactions for illustrative purposes only. The systems and methods described herein may be used for many different industries and purposes. In particular, the systems and methods may be used for any industry or purpose where there are events that appeal to advertisers. While use with real estate transactions is described to show operation of the systems and methods, it is understood that other applications are possible. Although not required, the systems and methods are described in the general context of computer program instructions executed by one or more computing devices. Computing devices typically include one or more processors coupled to data storage for computer program modules and data. Key technologies include, but are not limited to, the multi-industry standards of Microsoft Operating Systems, SQL Server, .NET Framework (VB.NET, ASP.NET, AJAX.NET, etc.), Oracle database BIEE products, other e-Commerce products and computer languages. Such program modules generally include computer program instructions such as routines, programs, objects, components, etc., for execution by the at least one processor to perform particular tasks, utilize data, data structures, and/or implement particular abstract data types. While the systems, methods, and apparatus are described in the foregoing context, acts and operations described hereinafter may also be implemented in hardware.

Figure 1:
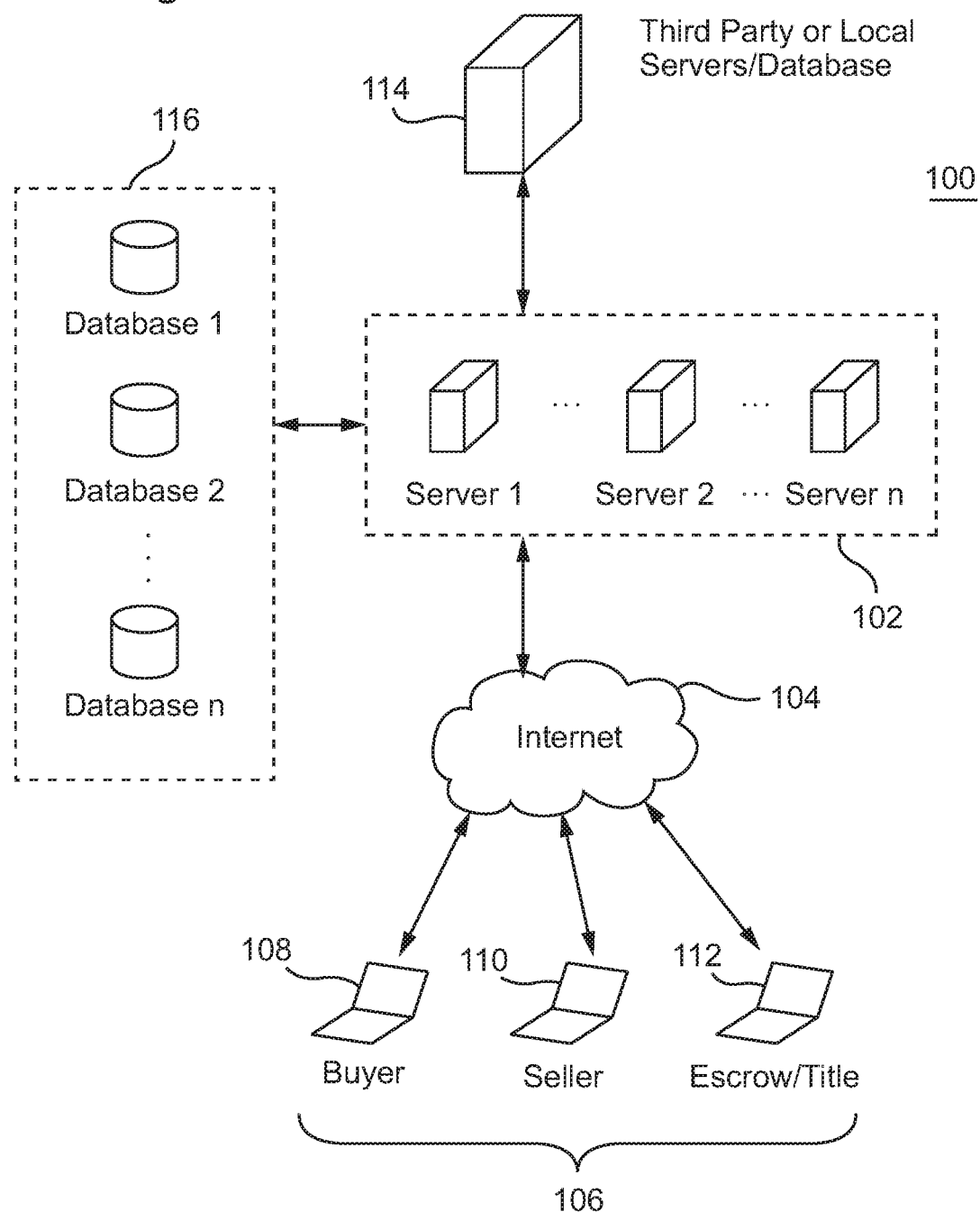
FIG. 1 shows an exemplary system for targeted adverting in a networked computing environment.

FIG. 1 shows an exemplary system 100 for targeted advertising campaigns according to one embodiment. In this exemplary implementation, system 100 may include one or more servers/computing devices 102 (e.g., server 1, server 2, . . . , server n) operatively coupled over network 104 to one or more client computing devices 106, such as one or more buyer computing devices 108, one or more seller computing devices 110, one or more escrow/title computing devices 112, etc. The one or more servers/computing devices 102 may also be operatively connected, such as over a network, to one or more third party servers/databases 114. The one or more servers/computing devices 102 may also be operatively connected, such as over a network, to one or more system databases 116 (e.g., database 1, database 2, . . . , database n).

Server/computing device 102 may represent, for example, any one or more of a server, a general-purpose computing device such as a server, a personal computer (PC), a laptop, and/or so on. Networks 104 represent, for example, any combination of the Internet, local area network(s) such as an intranet, wide area network(s), and/or so on. Such networking environments are commonplace in offices, enterprise-wide computer networks, etc. Client computing devices 106, which may include at least one processor, represent a set of arbitrary computing devices executing application(s) that respectively send data inputs to server/computing device 102 and/or receive data outputs from server/computing device 102. Such computing devices include, for example, one or more of desktop computers, laptops, mobile computing devices (e.g., tablets, smart phones, PDAs), server computers, and/or so on. In this implementation, the input data comprises, for example, requests, customer information, data files, dates, and/or so on, for processing with server/computing device 102. In one implementation, the data outputs include, for example, emails, templates, advertisements, and/or so on. Embodiments of the present invention may also be used for collaborative projects with multiple users logging in and performing various operations on a data project from various locations. Embodiments of the present invention may be web-based, smart phone-based and/or tablet-based.

In this exemplary implementation, server/computing device 102 includes at least one processor coupled to a system memory. System memory may include computer program modules and program data.

In embodiments of the present invention, one or more users may interact with the system. The system may include a processor and/or memory to operate the system and memory described herein. The one or more users may be divided into categories that include, but are not limited to, homeowners/sellers, buyers, professional users (title agents, escrow agents, realtors, attorneys, etc.), management companies (MCs), advertisers, system administrators, etc.

In embodiments of the present invention, one or more users may sign up to use the system. Sign up may be via website, telephone registration, paper forms, etc. Preferably, the sign up information provided by the user includes contact information, such as, but not limited to, email address, mailing address, phone numbers, and other identifying information. Based upon the sign up information, the users may be assigned to categories of users and may be granted corresponding privileges within the system. For example, the privileges may be distinct between a management company user and a homeowner user. The category of user may also determine what information is available on the system website.

Figure 2:
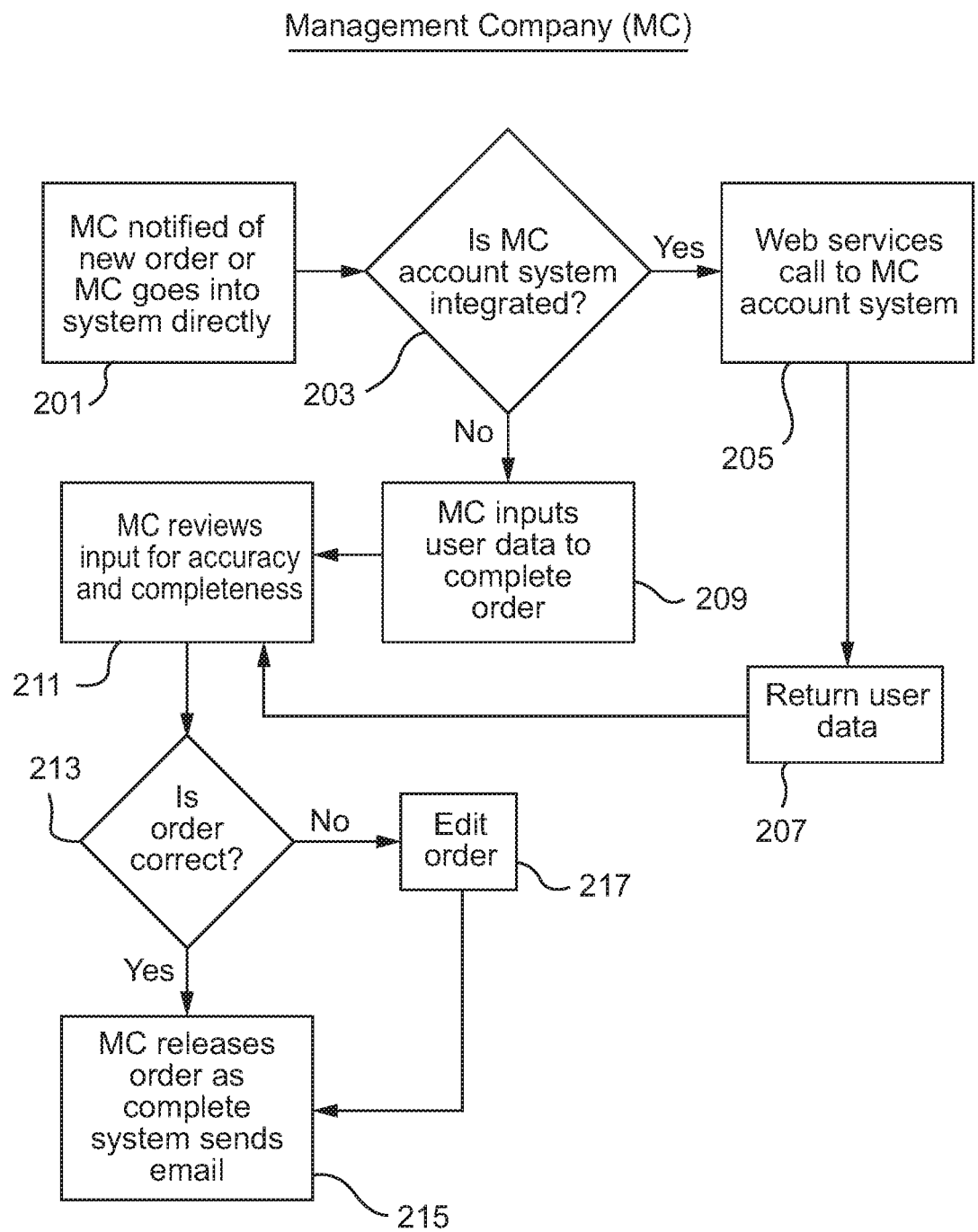
FIG. 2 shows an exemplary process for a management company process.
Figure 3:
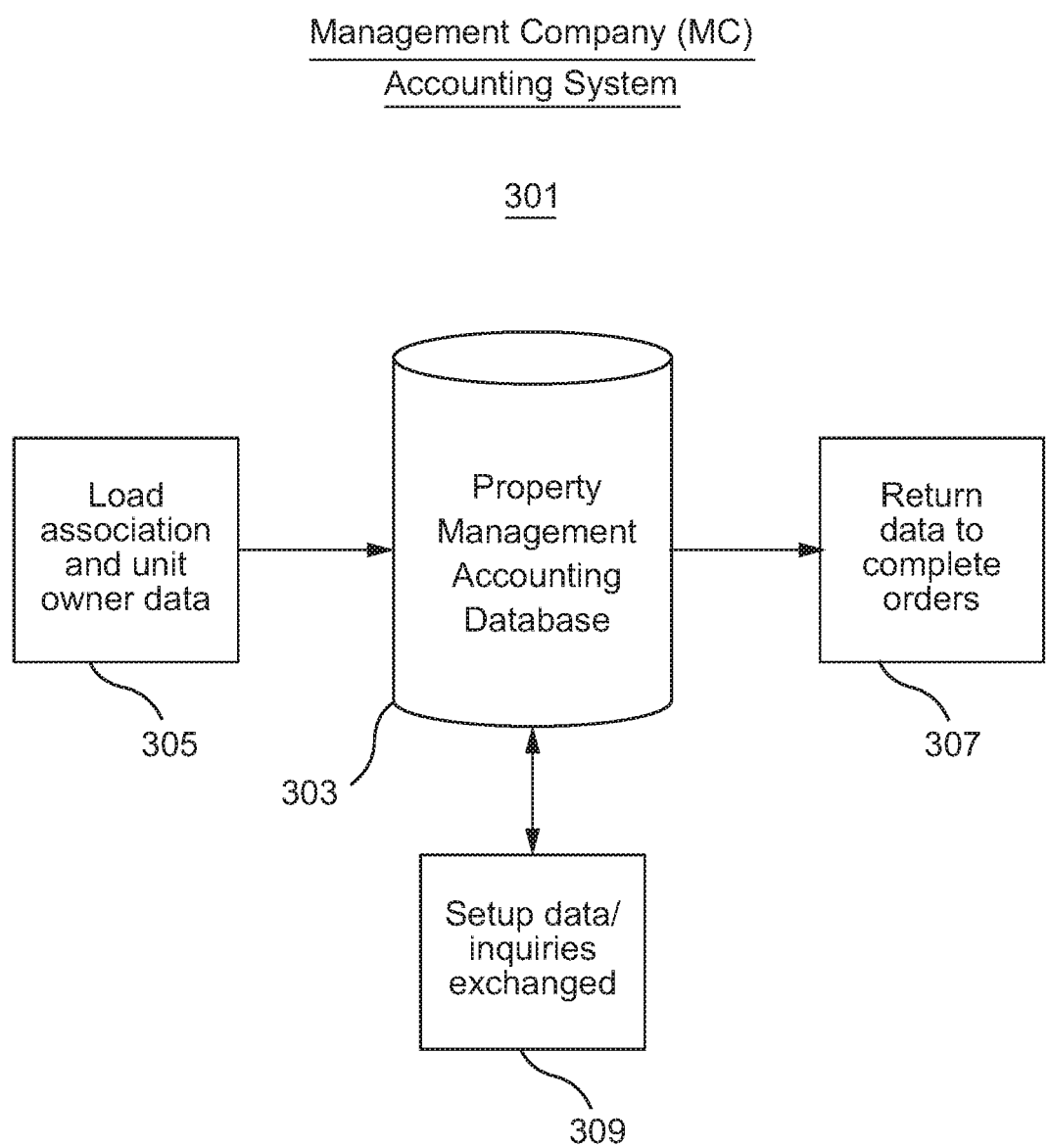
FIG. 3 shows an exemplary management company accounting system for use with the system of the present invention.

A primary user of the system may be a management company (MC). FIG. 2 shows an exemplary process for a management company process. FIG. 3 shows an exemplary management company accounting system for use with the system of the present invention.

A management company, such as a homeowner's association (HOA), may initially set up an account with the system. The management company may agree to use the system to process critical data, such as association data and/or homeowner data, and documents needed in real estate transaction and homeowner inquiries. Real estate transactions may include, but are not limited to, selling, refinancing, inquiries about documents, engaging real estate agents, listing homes in Multiple Listing Service (MLS), showing homes, identifying buyers, signing contracts, opening escrow, ordering disclosure package by one of the parties, etc. After approval, the management company may be granted access to the system and an account may be established. The account may include information about the properties managed by the management company, documents relevant to the management company, etc. The documents may include, but are not limited to, HOA governing documents, HOA critical data, state compliance forms, forms and products provided by the system, etc. The forms and products provided by the system may include, for example, 138 forms for California, property inspection forms, etc. Data may include association information, management company information, property address, name of closing agent, company and contact information, name of realtor, company and contact information, seller name, subject property and contact information, buyer name, current residence and contact information, estimated closing date, etc. The data may be manually loaded or automatically loaded through the management company accounting system, as shown in FIG. 3. The management company's account may then be activated making the documents and data available via the system to the management company, registered users, the general public, etc.

Orders for data and documents can be placed by homeowners or other users, such as title/escrow agents, realtors, attorneys, etc., representing one or more parties involved in the real estate transaction. During the order process, the system may collect buyer and seller contact information such as, but not limited to, email address, mailing address, phone numbers, and other identifying information. The system may also collect information pertaining to the transaction, such as, but not limited to, estimated closing date, sales price, etc.

As shown in FIG. 2, once a management company account is activated, the management company may be notified of any new orders to the system, or the management company may directly access the system to see new orders 201. A determination may be made as to whether the management company account system is integrated 203. If yes, a web services call may be made to the management account system 205. User data may be returned 207 from the management company accounting system. If the management company accounting system is not integrated, the management company may input user data to complete the new order 209. The management company may then review the input for accuracy and completeness 211. A check may be made to determine if the order is correct 213. If yes, the management company may release the order as complete and the system may send an email or other communication 215. If no, the order may be edited 217 before releasing the order as complete and sending an email or other communication. It should be noted that while email communications are described herein, the communications can include any type, such as voice, SMS, MMS, mail, etc.

After the completion of final step in the ordering process, users may be informed via the communication that they have earned access to pre-negotiated discounts by placing orders through the system. The users may be provided with a code and link to the system's advertising portal.

FIG. 3 shows an exemplary system for a management company accounting system 301. A property management accounting database 303 may receive association and unit owner data 305. The database 303 may return data to complete orders 307. The database 303 may communicate with the system to set up data and exchange inquiries 309.

Other users of the system may also set up accounts.

Figure 4:
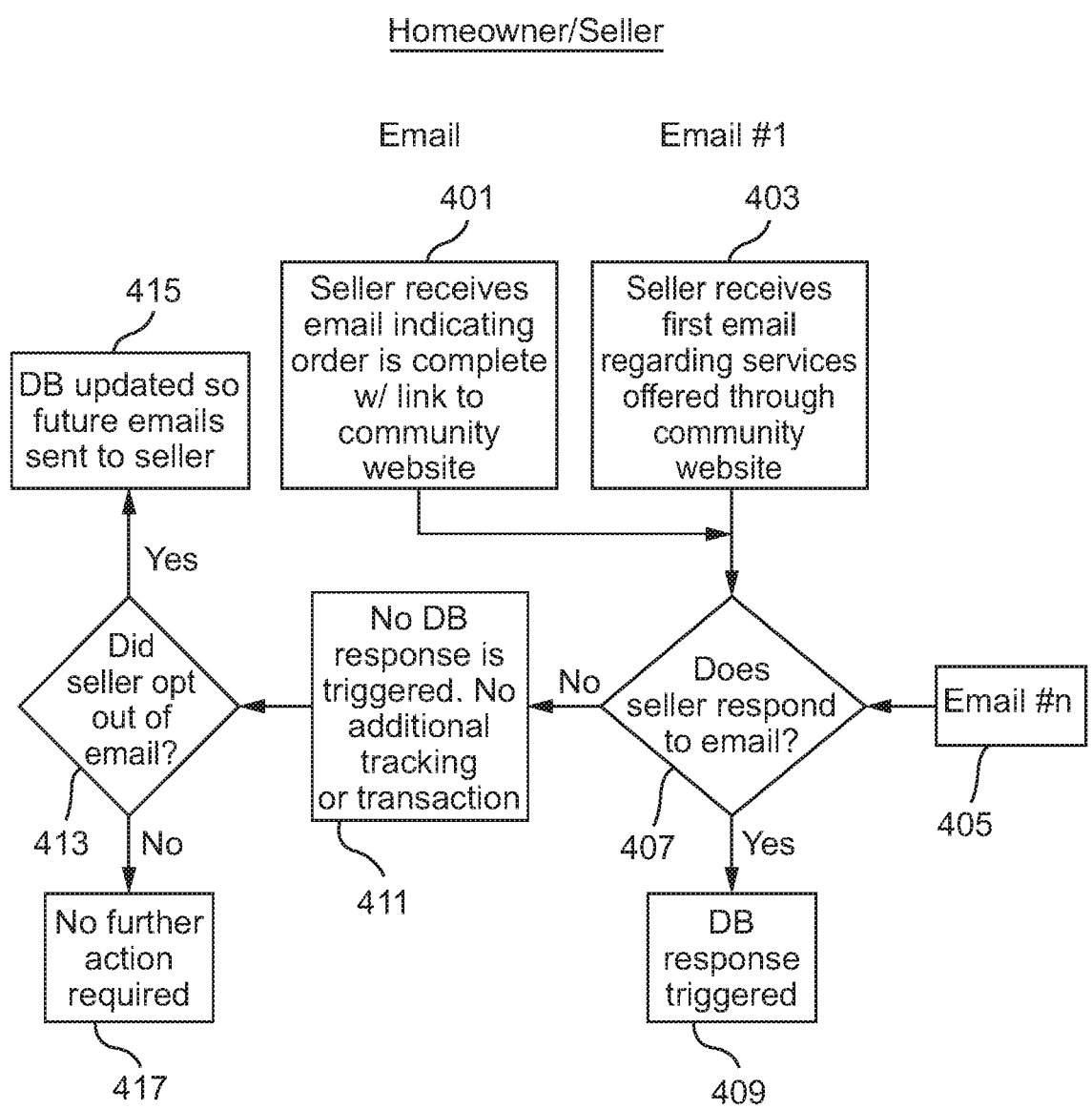
FIG. 4 shows an exemplary process for a homeowner/seller.

FIG. 4 shows an exemplary process for a homeowner/seller. After completion of the order process, as described above, the homeowner/seller may receive an initial communication, such as, for example, an email. The initial email 401 may indicate that the order is complete and may include a link to a portal for the community website. The homeowner/sell may receive subsequent emails, email #1 403, . . . , email #n 405, with links to the portal for the community website. A determination of the homeowner/seller response may be determined 407. If the homeowner/seller responds, a database response may be triggered 409. The database response may include tracking of any subsequent transactions. If there is no response, no further database response may be triggered, and no additional tracking or transactions may occur 411. A determination may be made whether the homeowner/seller opted out of email communications 413. If yes, the database is updated so future emails are not sent to the homeowner/seller 415. If no, no further action may be required 417.

Figure 5:
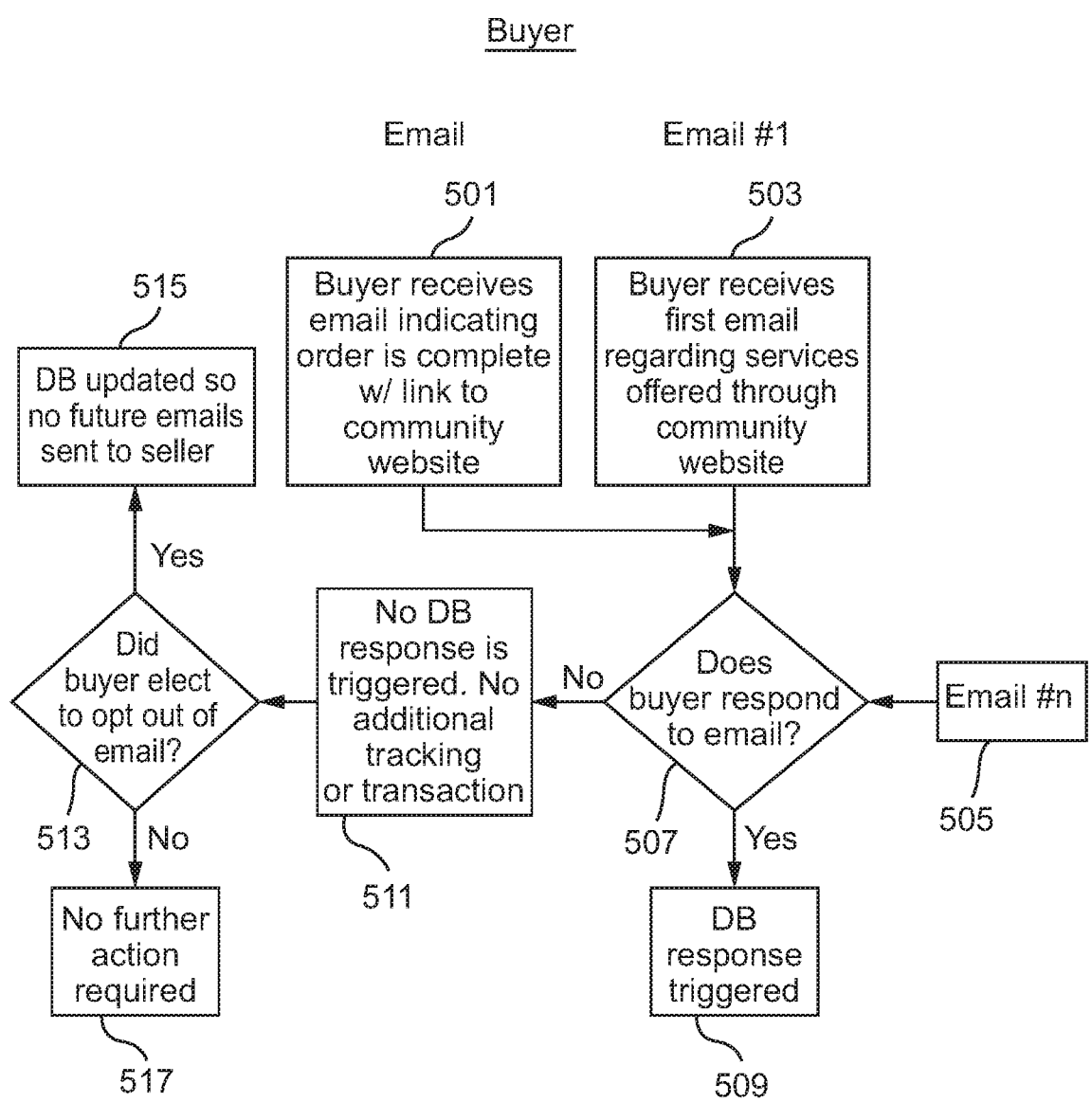
FIG. 5 shows an exemplary process for a buyer.

FIG. 5 shows an exemplary process for a buyer. After completion of the order process, as described above, the buyer may receive an initial communication, such as, for example, an email. The initial email 501 may indicate that the order is complete and may include a link to a portal for the community website. The buyer may receive subsequent emails, email #1 503, . . . , email #n 505, with links to the portal for the community website. A determination of the buyer response may be determined 507. If the buyer responds, a database response may be triggered 509. The database response may include tracking of any subsequent transactions. If there is no response, no further database response may be triggered, and no additional tracking or transactions may occur 511. A determination may be made whether the buyer opted out of email communications 513. If yes, the database is updated so future emails are not sent to the buyer 515. If no, no further action may be required 517.

Figure 6:
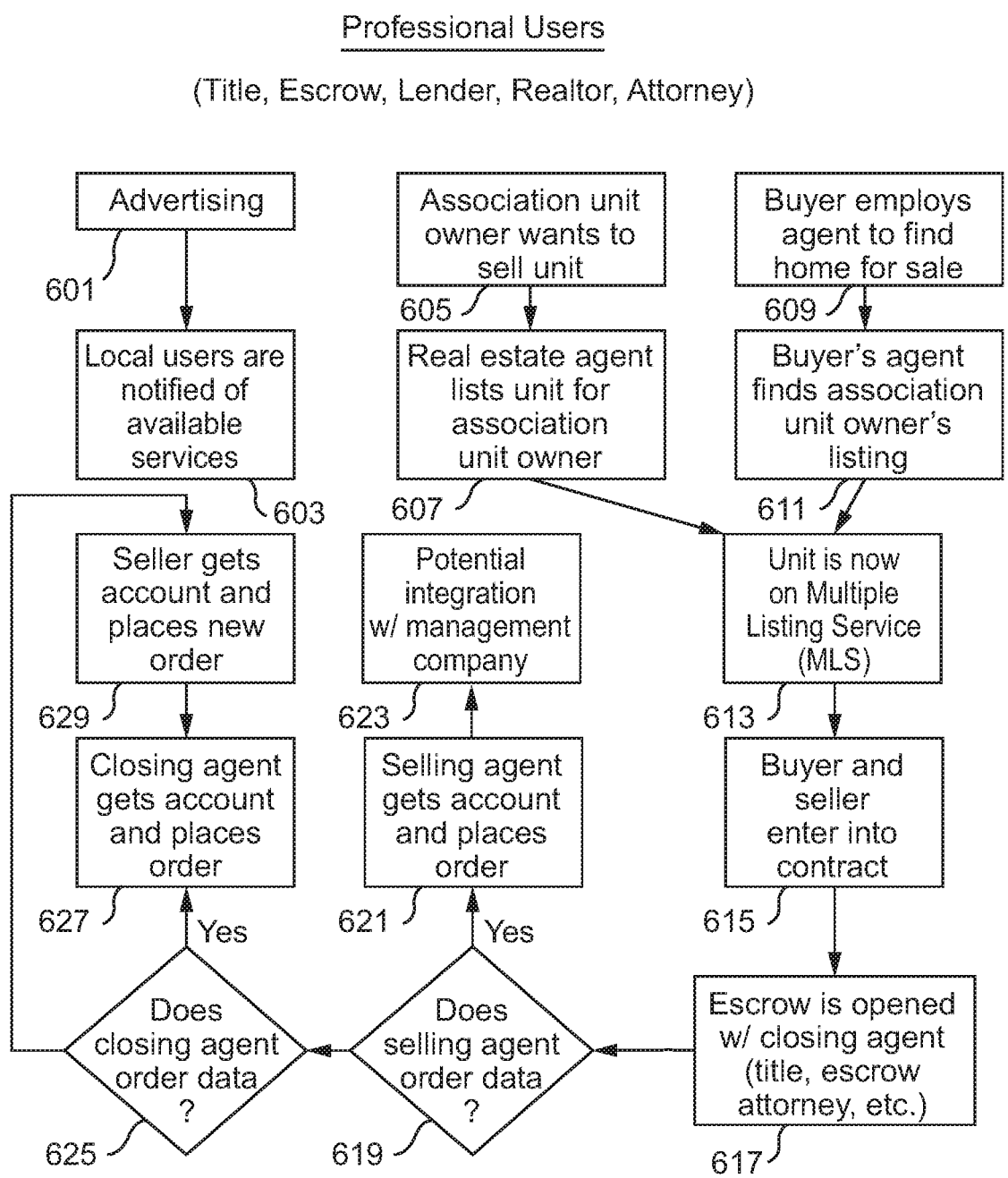
FIG. 6 shows an exemplary process for a professional user.

FIG. 6 shows an exemplary process for a professional user, such as title/escrow agent, lender, realtor, attorney, etc. Initially, advertising from the system may lead to local or national professional users to sign up with the system. In the advertising 601, professional users may be notified of services offered by the system 603. In an exemplary embodiment, a homeowner association unit owner may want to sell a unit 605. A real estate agent may list the unit for the homeowner 607. A buyer may employ a real estate agent to find a home for sale 609. The buyer's real estate agent may find the homeowner's listing 611. The unit may be listed with the Multiple Listing Service (MLS) 613. The buyer and the seller may enter into a contract for purchase of the unit 615. Escrow may be opened with a closing agent, such as a title agent, escrow attorney, etc. 617. A determination may be made as to whether the selling real estate agent will order data 619. If yes, the selling agent gets an account, or signs into an existing account, and places an order 621. Potential integration with the management company may be utilized 623. Integration may provide for updating of the database with new buyer and homeowner/seller information from the user. If no, a determination may be made as to whether the closing agent will order data 625. If yes, the closing agent gets an account, or signs into an existing account, and places an order 627. If no, the seller may get an account, or sign into an existing account, and place a new order 629.

Advertisers may also sign up with the system. Advertisers may contact the system and/or may be solicited. Specific advertisements may be placed in front of homeowners/sellers and prospective property owners with the management community's associations and accounts. Advertisers may include, but are not limited to: homeowner insurance carriers, home furnishings providers, landscapers, painters, roofers, appliance dealers, movers, etc.

Figure 7:
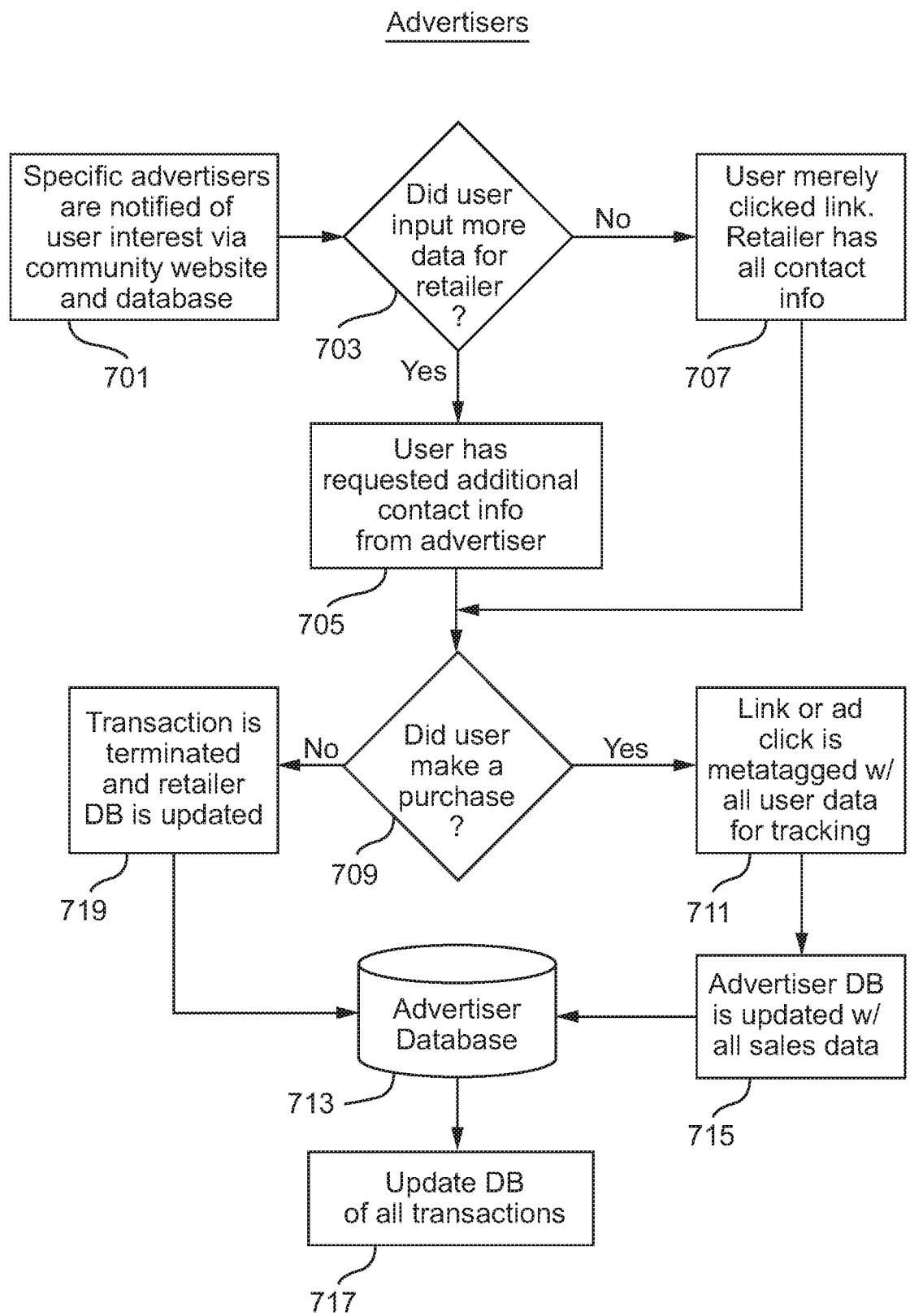
FIG. 7 shows an exemplary process for advertisers.

FIG. 7 shows an exemplary process for advertisers. Specific advertisers may be notified of user interest via the community portal or website 701. A determination may be made whether the user input more data for the retailer/advertiser 703. If yes, the user may have requested additional information from the advertiser 705. If no, the user may have merely clicked a link 707. The retailer may have all contact information. A determination may be made as to whether the user made a purchase 709. If yes, the link or advertisement that was clicked may be metatagged with all user data for tracking 711. The advertiser database 713 may be updated with all sales data 715. If no, the transaction may be terminated and the advertiser database 713 may be updated 719. The database 713 may be updated for all transactions 717.

Figure 8:
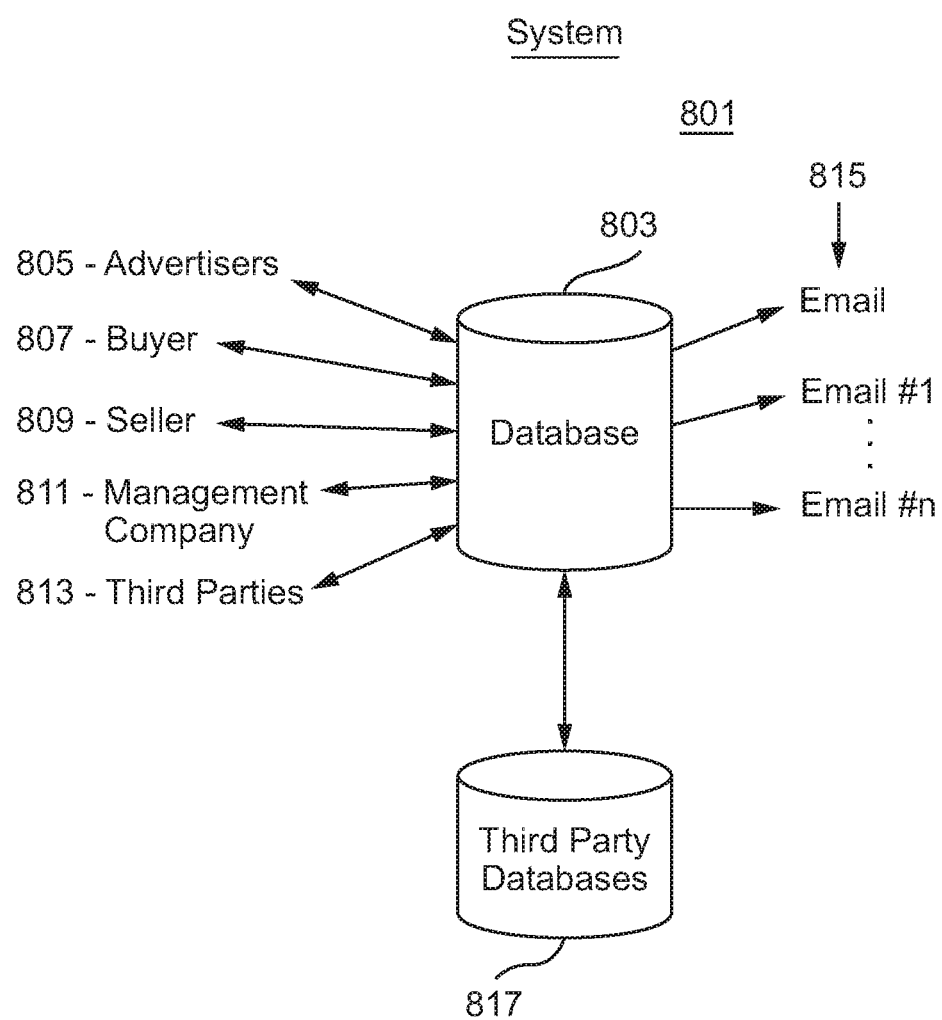
FIG. 8 shows an exemplary system, according to one embodiment.

FIG. 8 shows an exemplary system 801. A database 803 may interact with several parties, such as advertisers 805, buyers 807, homeowners/sellers 809, management companies 811 and/or third parties 813. The system 801 may store and/or send emails 815. The system 801 may also interact with one or more third party databases and/or servers 817.

Figure 9:
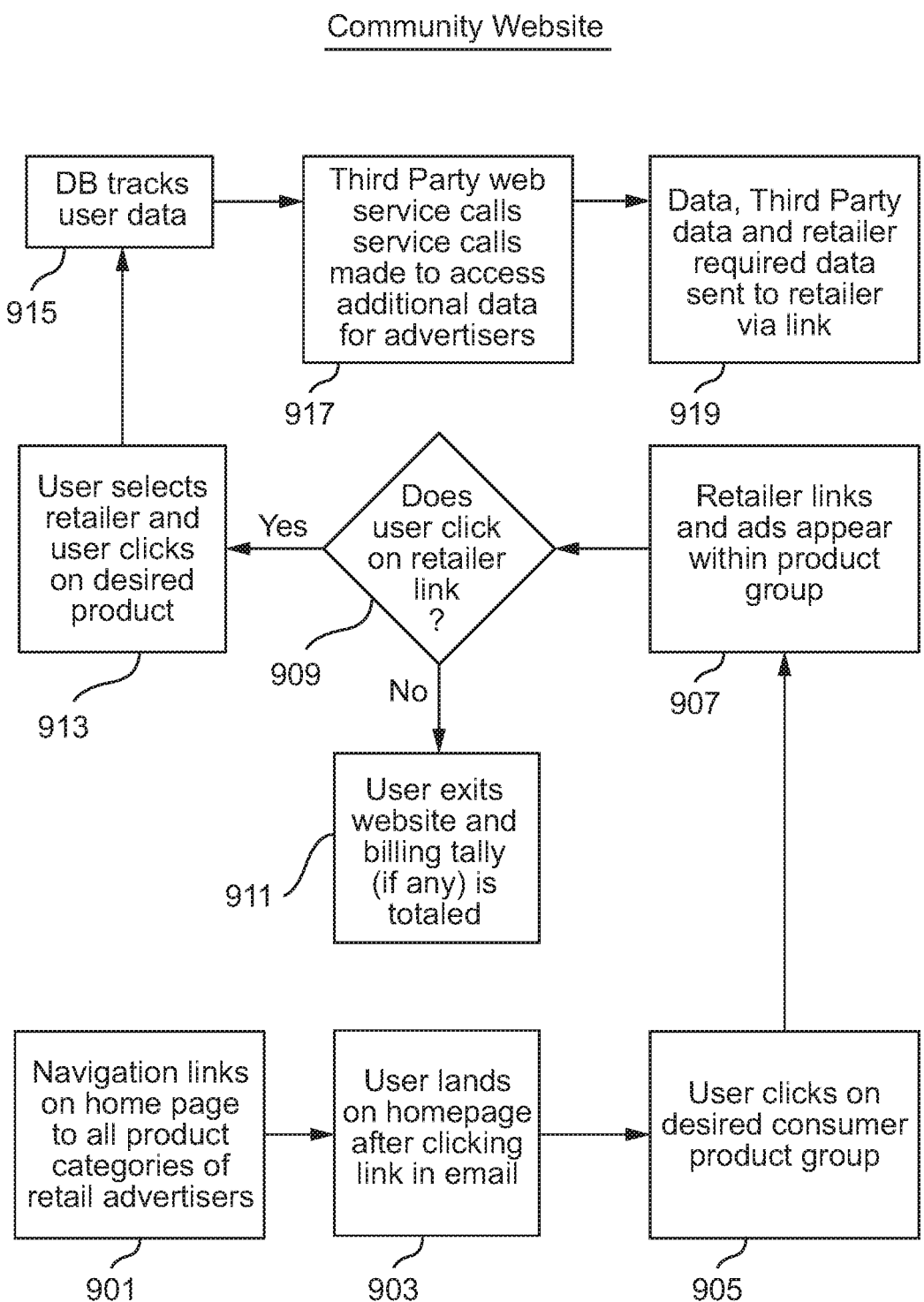
FIG. 9 shows an exemplary process for a community website or portal.

FIG. 9 shows an exemplary process for a community website or portal. Navigation links on a homepage or other page may direct users to all product categories of advertisers 901. Examples of product categories may include, but is not limited to, movers, contractors, appliance dealers, landscapers, etc. The user may land on the homepage, for example, after clicking a link in an email from the system 903. The user may click on a desired consumer product or service group 905. The advertiser links and advertisements may appear within the product or service group 907. A determination may be made as to whether a user clicked on a retailer link 909. If no, the user may exit the website and a billing tally, if any, is tracked 911. If yes, the user may select a retailer and the user may click on desired products or services 913. The database may track user data 915. Third party web service calls may be made to access additional data for advertisers 917. Data, third party data and retailer required data may be sent to the advertiser via a link or other communication 919.

Figure 10:
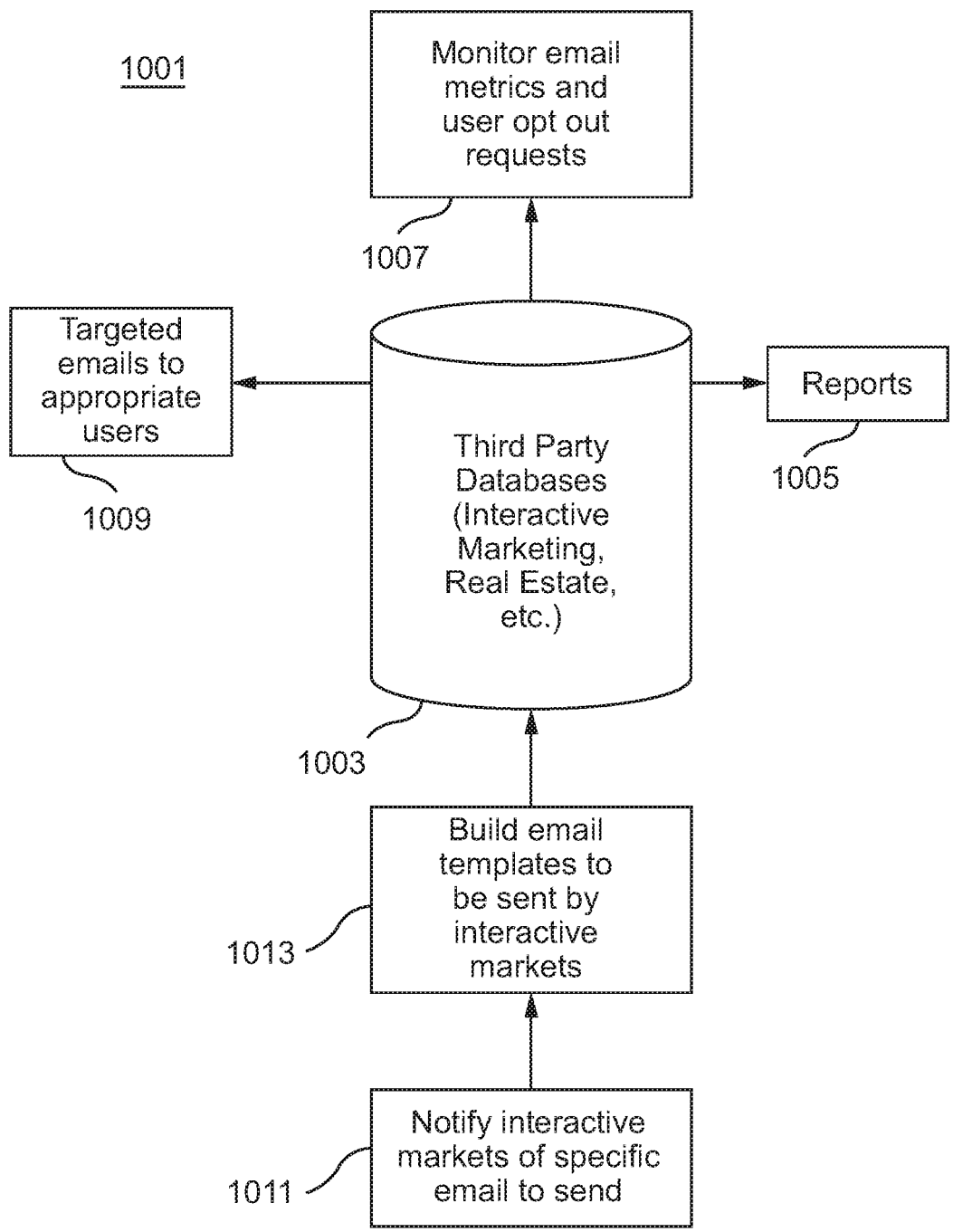
FIG. 10 shows an exemplary third party integration system.

FIG. 10 shows an exemplary third party integration system 1001. One or more third party databases 1003 may be integrated into the system through one or more APIs. Third party databases may include interactive marketers, real estate information aggregators, etc. The third party databases 1003 may perform various functions including, but not limited to, generating reports 1005, monitoring email metrics and user opt out requests 1007, preparing and sending targeted emails to appropriate users 1009, etc. An interactive marketer may be notified of a specific email to send to a user 1011. An email template may be built for sending by the interactive marketer 1013.

Database integration with third party databases may be provided via one or more APIs. This may allow for automated acquisition of property-specific and/or customer-specific data. Third parties may include accounting software companies, website providers, real estate data providers, interactive marketers, consumer product and service companies, real estate data providers, vendors, etc.

The system may then gather additional information about the property in question from third parties, such as ZILLOW, REDS, etc., to supplement information collected during the ordering process. Real estate information may include, but is not limited to, age of subject property, number of bedrooms, number of bathrooms, construction type, roofing material, pool information, fireplace information, etc. This information may not be specified in the real estate transaction. For example, upon entering or populating of a location field for a property, the system may pull data regarding the specific unit and owner from various locations, including, but not limited to, the management company's accounting software, third party real estate databases, etc. An interactive marketer may receive email specifications and/or templates from the system to send to users based on the information from the system databases and third party databases.

The email or other communications described herein may be generated by the system. One or more templates may exist for communications. Each communication may be related to a particular threshold or event, such as a date, income level, location, etc. For example, at a set time before a predetermined event, such as the estimated closing date, users, such as the buyer and seller, may be sent emails with offers from advertisers identified by the system. Events may be tracked through time. For example, communications may be sent around anniversaries of events with relevant offers for that anniversary. Advertisers may be identified through any system. In certain embodiments, advertisers may submit ideal criteria of buyers or sellers. The information collected about the buyers or sellers may be compared to thresholds of the criteria submitted by the advertisers. The best match between advertisers and properties, buyers or sellers may be provided. Alternatively, any advertiser's materials matching the buyer or seller may be provided. Criteria may include geographic location, property information, customer information, advertising fees, etc.

The email may include special offers, coupons, discounts, etc.

Email or other communications preferably come from a source known to the buyer or seller, such as a management company. The initial communications may include an introduction from the management company and an explanation of the system. The introduction may be via a video presentation. Use of a known source may improve user acceptance. Furthermore, this may improve branding of the management company.

Preferably, all email activity and user clicks may be recorded and tracked by the system and stored in a database. Data from the system or third parties may be metatagged within a link sent to the user. The metatagged link may be transmitted to the advertiser, such that they are able to use the metatagged information to communicate with the user, determine offers for the user, etc. This metatagged information may enable the advertiser to contact the user directly, and may enable services, such as instant quotes for enhanced customer service. In certain embodiments, the system can also provide buyers and sellers with the option to request competing quotes for goods or services from multiple vendors/advertisers registered with the system. Furthermore, the metatagged information may allow the system to track the user as they navigate the website. Data can be transmitted to a cell phone to use as a coupon with the advertiser or for immediate purchase online. Data can then be transmitted back to the system to track and record purchases for revenue tracking and use as metrics for advertisers.

In some alternatives of the invention, a Business-to-Business relationship may be established, in which local advertisers with businesses, such as courier services, waste management, insurance and other services, may be able to use data from the metatagged information to compete with other national businesses.

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

What is claimed is:

1. A system for targeted advertising, the system comprising:
   a server;
   one or more databases in communication with the server;
   the server executing a method comprising:
   receiving information regarding a future event from a user, wherein the information includes a time and a user identification;
   receiving local additional information regarding the future event from the one or more databases;
   receiving third party additional information regarding the future event from a plurality of third party databases;
   accessing advertiser information from the one or more databases;
   selecting one or more advertisements based on the advertiser information, the information regarding the future event, the local additional information, and the third party additional information;
   creating a communication template from the one or more selected advertisements; and
   sending the communication template, wherein the communication template has an embedded link.

2. The system of claim 1, wherein the event is a real estate transaction.

3. The system of claim 2, wherein the local additional information is information related to a real estate transaction.

4. The system of claim 2, wherein the third party additional information is information from a real estate database.

5. The system of claim 1, wherein the communication template is sent to the user and another party of the future event.

6. The system of claim 1, wherein the communication template is sent to an interactive marketer.

7. The system of claim 1, wherein the embedded link leads to a community website for a management company.

8. The system of claim 7, wherein the community website includes a categorized listing of advertisers.

9. The system of claim 1, wherein the communication template includes a multimedia presentation by a representative of a homeowner's association.

10. The system of claim 1, wherein the communication template is sent prior to the time.

11. The system of claim 1, further comprising tracking the user's actions with metatagged information.

12. The system of claim 11, further comprising storing the tracked information.

13. The system of claim 11, further comprising providing information regarding purchases or sales to an advertiser.

14. The system of claim 1, further comprising providing user contact information to one or more selected advertisers.

15. A system for targeted advertising in real estate transactions, the system comprising:
   a server;
   one or more databases in communication with the server;
   the server executing a method comprising:
   receiving information regarding a future real estate transaction from a user, wherein the information includes a time the real estate transaction will occur and a identification of the user;
   receiving local additional information regarding the future real estate transaction from the one or more databases, wherein the local additional information includes contact information for the user;
   receiving third party additional information regarding the future real estate transaction from a plurality of third party databases, wherein the third party additional information includes information about the real estate not found in the one or more databases;
   accessing advertiser information from the one or more databases;
   selecting one or more advertisements based on the advertiser information, the information regarding the future real estate transaction, the local additional information, and the third party additional information;
   creating a communication template from the one or more selected advertisements; and
   sending the communication template prior to the future real estate transaction, wherein the communication template has an embedded link to a community website for a management company.

16. The system of claim 15, wherein the communication template is sent to the user and another party of the future real estate transaction.

17. The system of claim 15, wherein the communication template is sent to an interactive marketer.

18. The system of claim 15, further comprising tracking the user's actions with metatagged information, storing the tracked information, and providing information regarding purchases or sales to an advertiser, and providing user contact information to one or more selected advertisers.

* * * * *